United States Patent [19]

Gall

[11] 3,921,511
[45] Nov. 25, 1975

[54] HORIZONTAL PRESS

[76] Inventor: Charles Henri Gall, 72, Avenue du General Leclerc, Cidex 01-03-09, 33220 Ste. Foy-la-Grande, France

[22] Filed: Jan. 29, 1974

[21] Appl. No.: 437,607

[30] Foreign Application Priority Data
Feb. 15, 1973  France .............................. 73.05278

[52] U.S. Cl. .................. 100/107; 100/112; 100/126
[51] Int. Cl.² ........................ B30B 9/06; B30B 9/08
[58] Field of Search ........... 100/107, 108, 126, 127, 100/128, 129, 111, 112, 116, 131

[56] References Cited
UNITED STATES PATENTS
| | | | |
|---|---|---|---|
| 1,182,306 | 5/1916 | Overton | 100/107 |
| 3,279,357 | 10/1966 | Farmer | 100/126 |
| 3,513,769 | 5/1970 | Sutter-Christ | 100/107 |

FOREIGN PATENTS OR APPLICATIONS
| | | | |
|---|---|---|---|
| 908,701 | 4/1954 | Germany | 100/126 |
| 245,938 | 11/1964 | Austria | 100/127 |
| 1,234,365 | 10/1960 | France | 100/110 |
| 592,298 | 4/1959 | Italy | 100/107 |

*Primary Examiner*—Harvey C. Hornsby
*Assistant Examiner*—James A. Niegowski
*Attorney, Agent, or Firm*—Wenderoth, Lind & Ponack

[57] ABSTRACT

The press has an outer cage and inner cage, the cages being coaxial and rotating together and pervious to the juices of the fruit to be pressed. The inner cage carries a plate which is axially movable with the inner cage toward and away from a fixed end wall supporting the outer cage. A cylinder of a cylinder device is integral with the inner cage and the piston of the cylinder device is held stationary. Fluid fed to the cylinder device causes the movable plate to move toward the fixed end wall and press the fruit the juices of which pass radially through the two pervious cages.

10 Claims, 6 Drawing Figures

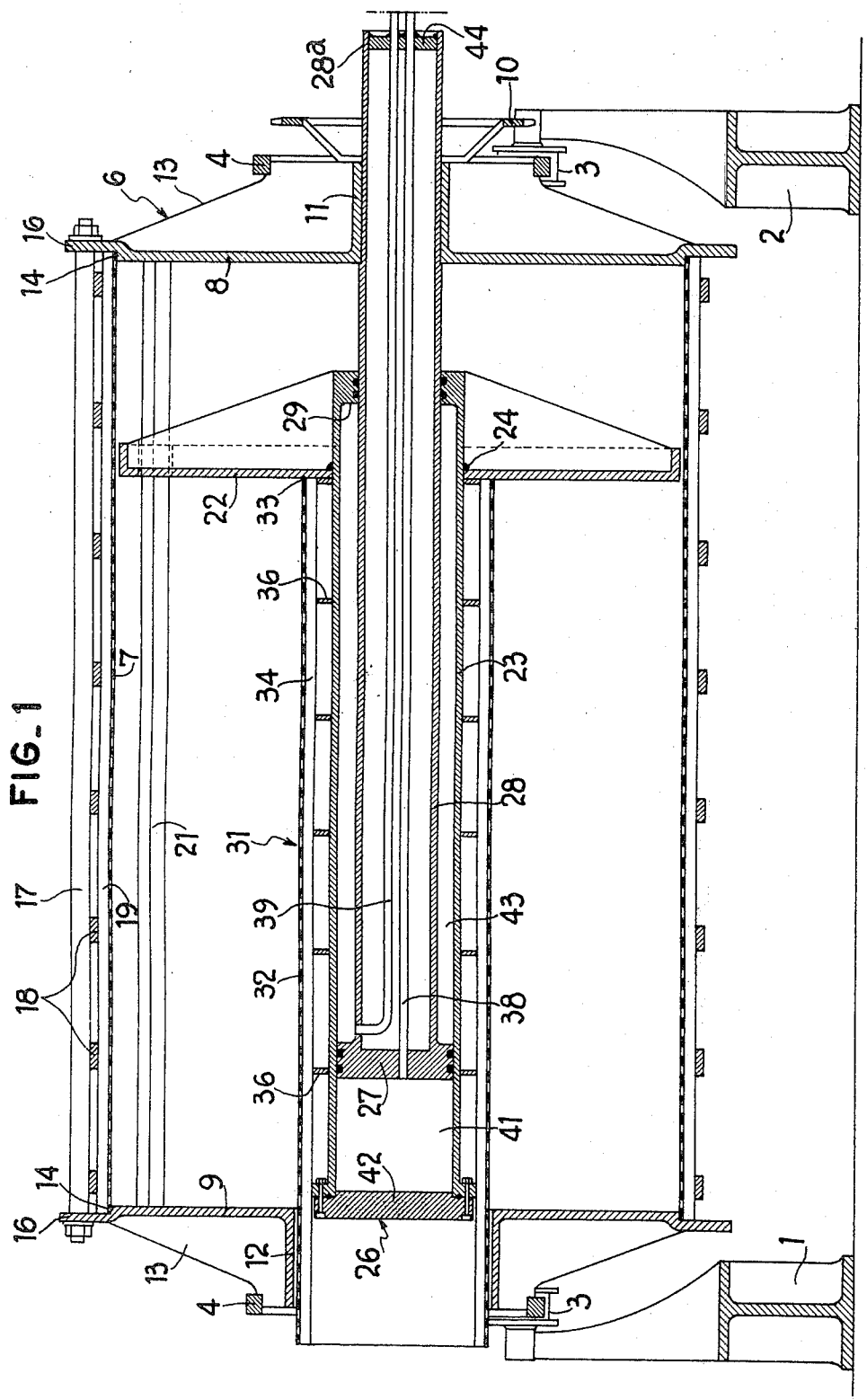

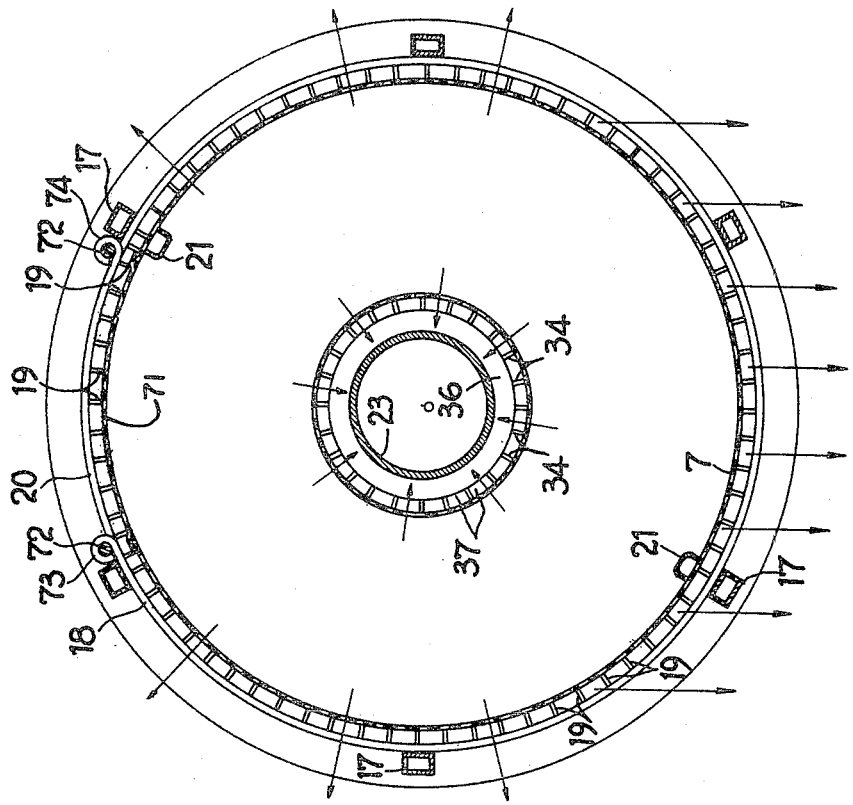
FIG_2
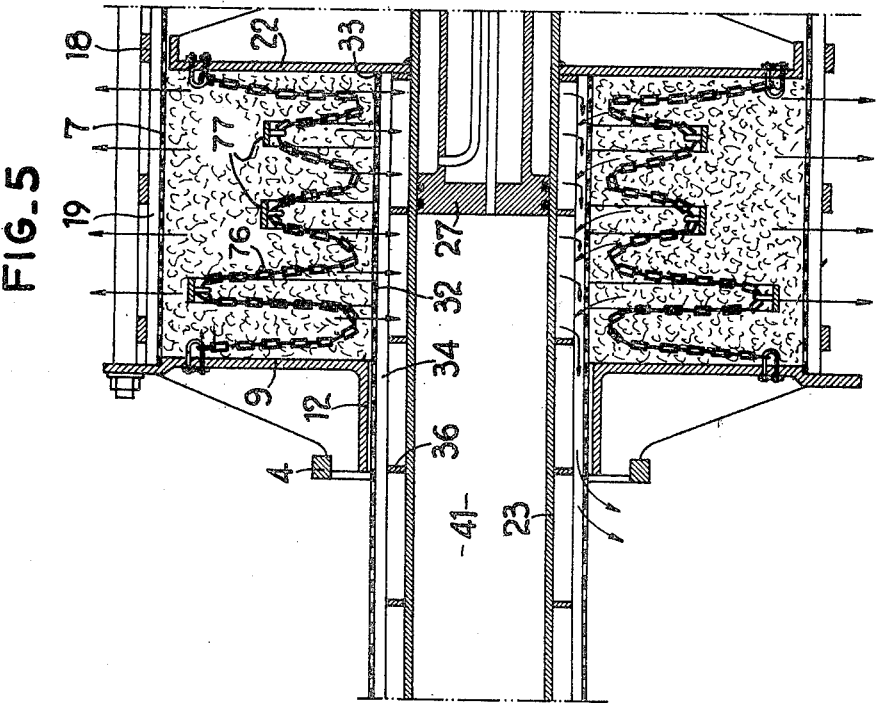
FIG_5

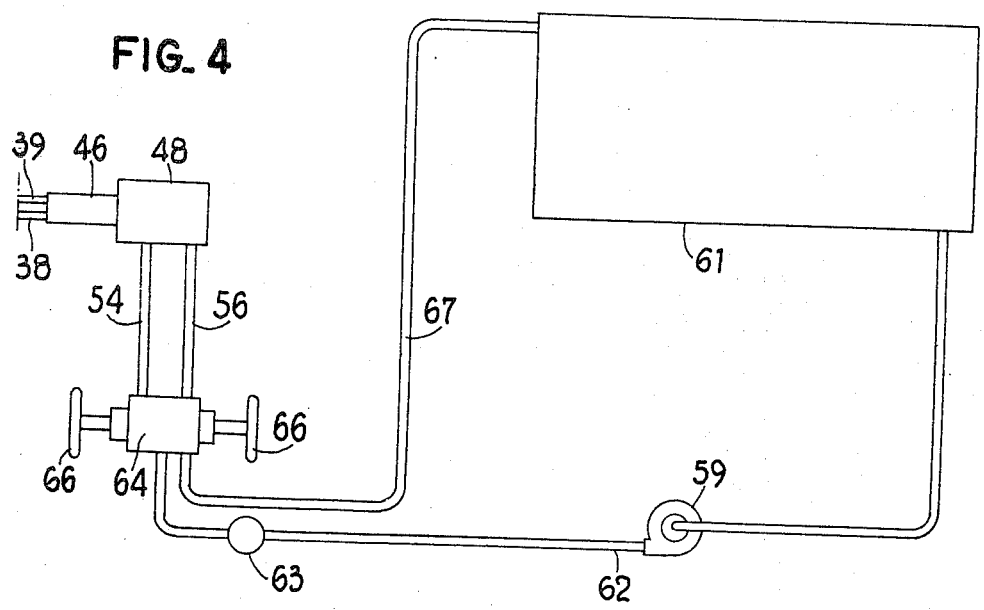
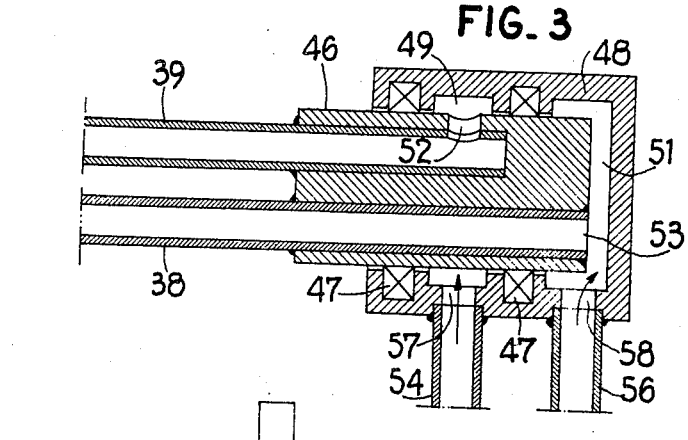
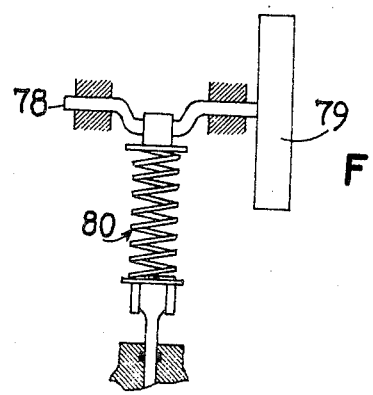

HORIZONTAL PRESS

The present invention relates to horizontal presses for the pressing of fruit and in particular grapes, comprising two concentric cylindrical cages which are pervious to the juices of the fruits to be pressed and connected to rotate together, and a plate which is movable in translation and connected to rotate with the two cages for pressing a mass of fruit disposed within the annular volume defined by the two cages and a fixed plate opposed to the movable plate.

An embodiment of such a press is described in French Patent 1,234,365 which more particularly concerns a press in which the movable plate is moved by means of three screws which are equally spaced apart, disposed between the two cages and rotate in synchronism, the cylindrical wall of the two cages being constituted by a perforated steel sheet. Owing, on one hand, to the existence of the centre cage which permits discharging the juice in the centre which is the most difficult to extract, and, on the other hand, to the utilisation of walls of perforated sheet in respect of which the ratio orifices/total surface area is much greater than with any other process of construction, such a press has a certain number of advantages:

the amount of grapes admitted is one fourth to one third higher than in conventional presses owing to the high flow of the juice during the loading operation;

the ease with which the juice flows out of the press permits higher pressing speeds;

the number of operations is usually three instead of five or six;

it is possible to press without difficulty stalked grapes which is quite impossible with presses having a cage of bars which allow masses of material to escape through the gaps between the bars;

the mechanical system employed permits effecting the first pressing without rotation of the cages which is essential for the obtainment of a perfectly clear juice.

However, there are a number of drawbacks in this press having a central juice discharge and three screws, namely;

from the mechanical and electrical point of view the construction is complex and consequently expensive;

the three screws are space consuming and liable to break;

it is difficult to clean the centre cage which is accessible only in the region of the doors of the outer cage.

Moreover, as in all mechanical horizontal presses, the lubrication of the screws is difficult and there is a danger of the lubricant becoming mixed with the juice. Another drawback resides in the difficulty of stopping the application of pressure in a sure manner.

An object of the invention is to overcome these drawbacks.

The invention provides a press of the aforementioned type wherein the inner cage, which extends through the fixed plate, is movable in translation with the movable plate and with a cylinder of a hydraulic cylinder device disposed within said cage, the piston of the cylinder device being prevented from moving in translation and defining with the solid end wall of the cylinder a chamber capable of being put under pressure for moving the movable plate towards the fixed plate and for pressing the mass of fruits, the pressure on the fruit being released by admitting drive fluid in an annular chamber defined between the cylinder and the tubular rod of the piston which extends from the piston in the direction away from the fixed plate.

The construction of the press just defined possesses an obvious advantage of simplcity, the sealing and precision of the cylinder device, which is preferably hydraulically controlled, being achieved without difficulty in the present state of the art of cylinder devices. Owing to the fact that the rotation of the cages and the translation of the movable plate are controlled by separate means, namely mechanical means, as in conventional presses, and a liquid under pressure, it is possible to render the corresponding movements independent and in particular to cause the movable plate to move without rotation of the cages.

The speed or rate of pressing of the fruit may be controlled easily by regulating the output of the pump putting the control liquid under pressure. Consequently it is possible to adapt the pressing rate to the characteristics of a particular fruit, such as the vine-plant, the condition of the fruit and local traditions. The operation may be carried out fully automatically by the use in the delivery conduit of the pump of a pressure gauge provided with electric contacts which permit a rational programming.

Owing to the fact that the regions of lubrication of the rotating parts may be located outside the cage, there is no danger of grease or oil becoming mixed with the juice. By selecting for the wall of the cages a perforated sheet of stainless steel, risk of impairment of the juices is avoided. The cleaning of the centre cage presents no difficulty since this cage is almost entirely outside the press when the movable plate has effected the whole of its travel in the direction for pressing the fruits.

The two chambers are supplied with liquid under pressure preferably by way of two conduits disposed within the tubular rod of the piston, these two conduits extending outside the press and their corresponding ends being secured in a cylindrical end member which rotates in a fluidtight manner in a distributor box having two separate chambers connected to two pipings of the hydraulic circuit which may be selectively connected to the delivery side of the pump.

In order to impart to the movable plate a degressive pressing speed, the pump is advantageously of the reciprocating type whose piston is controlled by a dynamometric connecting link known per se.

Further features and advantages of the invention will be apparent from the ensuing description with reference to the accompanying drawings.

In the drawings:

FIG. 1 is a longitudinal sectional view of a press according to the invention;

FIG. 2 is a cross-sectional view of the two concentric cages of the press shown in FIG. 1;

FIG. 3 is a sectional view of a distributor head for supplying fluid to the chambers of the cylinder device controlling the movable plate;

FIG. 4 is a hydraulic diagram including the distributor shown in FIG. 3;

FIG. 5 is a partial axial sectional view of the movable plate of the press in its position at the end of the pressing of the fruits, and FIG. 6 is a diagrammatic view of a dynamometric connecting link for driving a reciprocating pump.

The press shown in FIG. 1 comprises two cradles 1, 2 in the upper part of each one of which there are mounted two rotary rollers 3 having two flanges on which each end of a runway 4 bears, each runway being provided at the end of a cage 6 of the press whose pervious cylindrical wall 7 is formed by a perforated sheet of stainless steel. This perforated sheet is supported by two end walls 8, 9 each of which has a centre hub 11, 12 and radial ribs 13 which support the runway 4. The wall 8 carries a chain sprocket wheel 10 for driving the cage 6 in rotation.

The perforated wall 7 bears at its ends on a cylindrical shoulder 14 which adjoins the planar inner surface of the wall 8, 9 and is radially extended by a flange 16. Equally spaced spacer members 17 are bolted between the two flanges 16 which tightly engage longitudinally spaced cylindrical rings 18 in contact with radially disposed longitudinally extending flat strips 19 which bear against the perforated sheet 7. A number of longitudinally extending guides 21 are secured to the inner wall of the perforated sheet 7 and slidably key a pressure-applying plate 22 which is movable in axial translation for pressing the fruit against the fixed plate constituted by the end wall 9. The centre part of the plate 22 has axially extending therethrough a cylinder 23 which is rendered integral with this plate by welding 24 and constitutes the moving part of a hydraulic cylinder device 26 whose fixed part is formed by a piston 27 whose rod 28 is a tube concentric with the cylinder and extending in a fluidtight manner through an annular end wall 29 of the cylinder 23 and secured in the hub 11 of the end wall 8. The cylinder 23 is connected to move with an auxiliary or inner cage 31 comprising a perforated cylindrical wall 32 which is of stainless steel, one of the ends of this wall being secured at 33 to the movable plate 22 and the other end extending through the hub 12 of the end wall 9 and being in sliding contact with this hub. The wall 32 of the inner cage is assembled with the cylinder 23 by means of longitudinally-extending flat strips 34 which are disposed radially and assembled with the periphery of longitudinally-spaced flat rings 36 secured to the outer surface of the cylinder 23. The strips 34 define therebetween longitudinal passages 37 for the flow of the juice. Two longitudinally-extending conduits 38, 39 disposed within the tubular rod 28 of the piston 27, communicate respectively with a working chamber 41 defined between the piston 27 and the solid end wall 42 of the cylinder 23 and with the annular chamber 43 radially defined by the cylinder 23 and the tubular rod 28 and axially defined by the piston 27 and the annular end wall 29 of the cylinder. The two conduits are maintained, at the end thereof opposed to the piston 27, by an end disc 44 which closes the end 28a of the tubular rod 28 located outside the sprocket wheel 10. The corresponding end of the supply conduits 38, 39 is secured in a cylindrical end connector member 46 which rotates, with interposition of sealing elements 47, in an inner cavity of a fixed distributor box 48 (FIG. 3) which contains two inlet chambers 49 and 51 which are independent from each other. The chamber 49 communicates by way of a radial orifice 52 in the connector 46 with the conduit 39 and the chamber 51 communicates with the conduit 38 at 53.

Two pipings 54, 56, which respectively coommunicate with the chamber 49 and chamber 51 by way of the orifices 57 58 of the distributor box 48, are part of a hydraulic circuit (FIG. 4) comprising a pump 59 which is connected to a tank 61 and whose delivery conduit 63 in which a pressure gauge 63 is inserted, can be connected to either of the pipings 54 and 56 by a distributor 64 which has been shown merely by way of example in the form of an apparatus having manual control wheels 66 and which it will be understood may also put the pipings 54 and 56 in communication with the conduits 67 returning to the tank 61. The pressure gauge 63 advantageously includes electric contacts (not shown) which are capable of ensuring the fully automatic control of the press.

For loading the crop of fruit in the press, the main cage 6 includes a door 20 (FIG. 2) comprising pervious and detachable panels 71 which have the same curvature as the cylindrical wall 7 and can be secured in corresponding openings in the wall 7 by means of pins 72 engaged in eyes 73 formed in a ring 18 integral with a longitudinally-extending member 17 and in eyes 74 integral with the panels 71.

FIG. 5 also shows chains 76 the ends of which are respectively fixed to the fixed plate 9 and the movable plate 22 and whose intermediate links are connected to rings 77 disposed between the plates. These chains are employed in the known manner for the pressing of the marc.

It will be clear that when the working chamber 41 axially defined by the end wall 42 of the cylinder and the piston 27 is put under pressure by way of the conduit 38, the plate 22 is made to undergo a longitudinal movement of translation for pressing the crop, introduced by way of the loading door 20 (FIG. 2), between the fixed plate 9 and the movable plate 22. The juice flows radially to the exterior through the perforated wall 7 of the main cage 6 and inwardly through the perforated wall 32 of the inner cage 31, the longitudinally-extending passages 37 enabling the juice thereafter to flow axially and issue from the press at the end of the hub 12. The flows of two fractions of juice are indicated by the arrows in FIGS. 2 and 5.

It is possible to press the fruit by merely the axial movement of the plate 23, but it is also possible, in particular after a first pressing, to ensure simultaneously the movement in translation of the plate 22 and the rotation of the two cages 6, 31 and cylinder device 25, by driving the sprocket wheel 10. The plate 22 is returned by putting the annular chamber 43 under pressure, the chamber 41 being simultaneously connected to the tank 51.

It may be advantageous to arrange that the pump 51 be constructed in the form of a reciprocating pump whose piston is actuated by a crankshaft 78 (driven by a pulley 79) through a dynamometric connecting rod 80 which enables the crop to be pressed in a degressive manner (FIG. 6).

It must be understood that the details of construction of the press have been merely given by way of example. Thus, the drive including the chain engaging the sprocket wheel 10 could be replaced by a drive including gear wheels or a belt.

Having now described my invention, what I claim as new and desire to secure by Letters Patent is:

1. A substantially horizontal press for pressing fruit and in particular grapes, comprising an inner cylindrical cage and an outer cylindrical cage coaxial with the inner cage, the cages having walls pervious to the juice of the fruit to be pressed and defining an annular space and being interconnected to rotate together, a fixed plate adjacent a first end of the outer cage, a second plate movable relative to the first plate axially of the cages between a position adjacent a second end of the outer cage opposed to said first end and a position adjacent said first end of the outer cage, the first plate and second plate axially defining said annular space, the inner cage being connected to move axially with the movable plate and being axially movable through the fixed plate, a fluid cylinder device disposed within the inner cage and comprising a cylinder, a piston axially slidable in the cylinder and a piston rod connected to the piston, means for preventing the piston from moving axially of the fixed plate, means for connecting the cylinder to the movable plate to move axially with the movable plate, a first chamber being defined between the cylinder and the piston on one side of the piston and an annular chamber being defined between the cylinder, piston and piston rod on an opposite side of the piston, and means for supplying actuating fluid selectively to said first chamber and to said annular chamber for respectively moving the movable plate toward the fixed plate for pressing the fruit and moving the movable plate away from the fixed plate and releasing pressure on the fruit, the cylinder defining with the inner cage an annular space for the axial flow of the juice which passes through the inner cage.

2. A press as claimed in claim 1, wherein the fixed plate constitutes an end wall which supports the outer cage and has a hub defining a cylindrical bore in which the inner cage is slidable.

3. A press as claimed in claim 2, comprising a second end wall opposed to the first-mentioned end wall and supporting the outer cage and having a hub which defines a cylindrical bore in which the piston rod is fixed.

4. A press as claimed in claim 2, comprising a support cradle for each end of the outer cage, rollers rotatably mounted on each cradle, a second end wall opposed to the first-mentioned end wall and supporting the outer cage, each end wall carrying a runway which is rotatably supported by the rollers of the corresponding support cradle.

5. A press as claimed in claim 1, comprising a chain sprocket wheel connected to the outer cage for rotating the outer cage.

6. A press as claimed in claim 1, comprising annular spacer members carried by the cylinder and longitudinally-extending ribs secured to an inner surface of the inner cage and spaced apart circumferentially of the inner cage and engaging the spacer members for interconnecting the cylinder and inner cage.

7. A press as claimed in claim 1, wherein the two cages have perforated stainless steel sheet walls.

8. A press as claimed in claim 1, wherein the piston rod is tubular and the means for supplying actuating fluid comprise a conduit which communicates with said first chamber and a conduit which communicates with said annular chamber, the conduits extending longitudinally through the tubular piston rod beyond the second end of the outer cage, a distributor box for supplying fluid under pressure, an end connector member connected to the two conduits and rotatable in a fluid-tight manner in the distributor box and passage means putting the conduits in communication with the distributor box through the end connector member.

9. A press as claimed in claim 8, wherein the distributor box defines two separate chambers respectively communicating with the two conduits, there being combined with the press a hydraulic circuit comprising two pipings respectively communicating with the two chambers, a pump having a delivery conduit, and means for connecting the delivery conduits to selected ones of said two pipings.

10. A press as claimed in claim 1, comprising means defining on the inner surface of the inner cage longitudinally-extending passages in said annular space between the cylinder and the inner cage.

* * * * *